(12) United States Patent
Laghrari et al.

(10) Patent No.: US 7,996,235 B2
(45) Date of Patent: *Aug. 9, 2011

(54) TELEMATICS MARKETING INFORMATION ACQUISITION TRIGGERING METHOD AND SYSTEM

(75) Inventors: Fahd Z. Laghrari, Southfield, MI (US); Anthony J. Sumcad, Southfield, MI (US)

(73) Assignee: General Motors LLC, Detroit, MI (US)

( * ) Notice: Subject to any disclaimer, the term of this patent is extended or adjusted under 35 U.S.C. 154(b) by 1055 days.

This patent is subject to a terminal disclaimer.

(21) Appl. No.: 11/201,045

(22) Filed: Aug. 10, 2005

(65) Prior Publication Data

US 2007/0038510 A1 Feb. 15, 2007

(51) Int. Cl.
*G06Q 10/00* (2006.01)
*G06F 19/00* (2011.01)
*G06G 7/70* (2006.01)

(52) U.S. Cl. ........... 705/1.1; 705/14.53; 705/14.48; 705/14.58; 705/14.62; 705/14.66; 705/26.1; 701/117; 701/29; 701/33; 701/34; 701/118; 455/466; 455/557; 455/411; 455/420; 455/426.1

(58) Field of Classification Search .................. None
See application file for complete search history.

(56) References Cited

U.S. PATENT DOCUMENTS

| | | | |
|---|---|---|---|
| 5,943,416 A * | 8/1999 | Gisby | 379/265.13 |
| 6,330,499 B1 | 12/2001 | Chou et al. | |
| 6,526,335 B1 * | 2/2003 | Treyz et al. | 701/1 |
| 6,604,033 B1 | 8/2003 | Banet et al. | |
| 6,606,377 B2 * | 8/2003 | Ruckart et al. | 379/121.02 |
| 6,611,194 B1 * | 8/2003 | Vieweg et al. | 340/5.2 |
| 6,611,740 B2 | 8/2003 | Lowrey et al. | |
| 6,735,503 B2 | 5/2004 | Ames | |
| 6,735,506 B2 | 5/2004 | Breed et al. | |
| 6,960,990 B2 | 11/2005 | McKibbon | |
| 7,119,716 B2 * | 10/2006 | Horstemeyer | 340/994 |
| 7,170,390 B2 * | 1/2007 | Quinones et al. | 340/5.3 |
| 7,194,073 B2 * | 3/2007 | Watkins et al. | 379/114.2 |
| 7,245,204 B2 * | 7/2007 | Ramos et al. | 340/426.12 |
| 7,280,818 B2 * | 10/2007 | Clayton | 455/407 |
| 7,289,786 B2 * | 10/2007 | Krasner | 455/404.2 |
| 7,420,920 B2 * | 9/2008 | True et al. | 370/235 |
| 2003/0143976 A1 | 7/2003 | Wang | |
| 2003/0162525 A1 | 8/2003 | Stefan et al. | |
| 2003/0217002 A1 | 11/2003 | Enborg | |
| 2004/0127193 A1 * | 7/2004 | Timmins et al. | 455/405 |
| 2004/0259524 A1 * | 12/2004 | Watkins et al. | 455/405 |

(Continued)

OTHER PUBLICATIONS

Intelligent Vehicle Technologies: Theory and Applications; By Ljubo Vlacic, Michel Parent, Fumio Harashima Contributor Ljubo Vlacic, Michel Parent, Fumio Harashima; Edition: illustrated Published by Butterworth-Heinemann, 2001 ISBN 0750650931, 9780750650939; 498 pages, see attached pp. 252-253.*

(Continued)

*Primary Examiner* — Matthew L Brooks

(74) *Attorney, Agent, or Firm* — Dierker & Associates, P.C.

(57) ABSTRACT

A method for acquiring marketing information from a marketing call center. The method involves a setting of a marketing information trigger based on a pre-determined event corresponding to at least one of a vehicle and an in-vehicle telematics unit, and an initiation of a call to the marketing call center to acquire the marketing information in response to an occurrence of the pre-determined event.

3 Claims, 6 Drawing Sheets

U.S. PATENT DOCUMENTS

| | | |
|---|---|---|
| 2004/0266292 A1 | 12/2004 | Gassan et al. |
| 2005/0027438 A1 | 2/2005 | Rockett et al. |
| 2005/0065711 A1 * | 3/2005 | Dahlgren et al. ............. 701/117 |
| 2005/0100148 A1 | 5/2005 | Watkins et al. |
| 2005/0137763 A1 | 6/2005 | Watkins et al. |
| 2005/0201545 A1 | 9/2005 | Rockett et al. |
| 2007/0133767 A1 * | 6/2007 | Hahn et al. ................. 379/114.2 |

OTHER PUBLICATIONS

Intelligent Vehicle Technologies: Theory and Applications; By Ljubo Vlacic, Michel Parent, Fumio Harashima Contributor Ljubo Vlacic, Michel Parent, Fumio Harashima; Edition: illustrated Published by Butterworth-Heinemann, 2001; ISBN 0750650931, 9780750650939; 498 pages, see attached pp. 252-254.*

* cited by examiner

TELEMATICS MARKETING INFORMATION ACQUISITION TRIGGERING METHOD AND SYSTEM

FIELD OF THE INVENTION

The present invention generally relates to in-vehicle telematics unit acquiring marketing information related to telematics services and telematics products from a marketing call center. The present invention specifically relates to triggering the in-vehicle telematics unit to acquire the marketing information from the marketing call center.

BACKGROUND OF THE INVENTION

Inclusion of wireless communication systems within mobile vehicles provides an opportunity to communicate between the vehicle and various locations. For example, an operator of such a vehicle may subscribe to an in-vehicle messaging service that enables the subscriber to pull marketing information related to a marketing of various telematics services and telematics products from a marketing call center via a wireless connection. Currently, a subscriber must manually operate an in-vehicle telematics unit in order to pull marketing information related to a marketing of various telematics services and telematics products to the vehicle.

The present invention overcomes these disadvantages and advances the state of the acquiring marketing information.

SUMMARY OF THE INVENTION

One aspect of the present invention provides a method for acquiring marketing information from a marketing call center. The method comprises setting a marketing information trigger based on a pre-determined event corresponding to at least one of a vehicle and an in-vehicle telematics unit, and an initiation of a call to the marketing call center to acquire the marketing information in response to an occurrence of the pre-determined event.

Another aspect of the invention provides a computer readable medium for acquiring marketing information from a marketing call center. The computer readable medium comprises computer readable code for setting a marketing information trigger based on a pre-determined event corresponding to at least one of a vehicle and an in-vehicle telematics unit, and computer readable code for initiating a call to the marketing call center to acquire the marketing information in response to an occurrence of the pre-determined event.

Another aspect of the invention provides a system for acquiring marketing information from a marketing call center. The method comprising means for setting a marketing information trigger based on a pre-determined event corresponding to at least one of a vehicle and an in-vehicle telematics unit, and means for initiating a call to the marketing call center to acquire the marketing information in response to an occurrence of the pre-determined event.

The aforementioned and other features and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PREFERRED EMBODIMENTS

Figure 1:
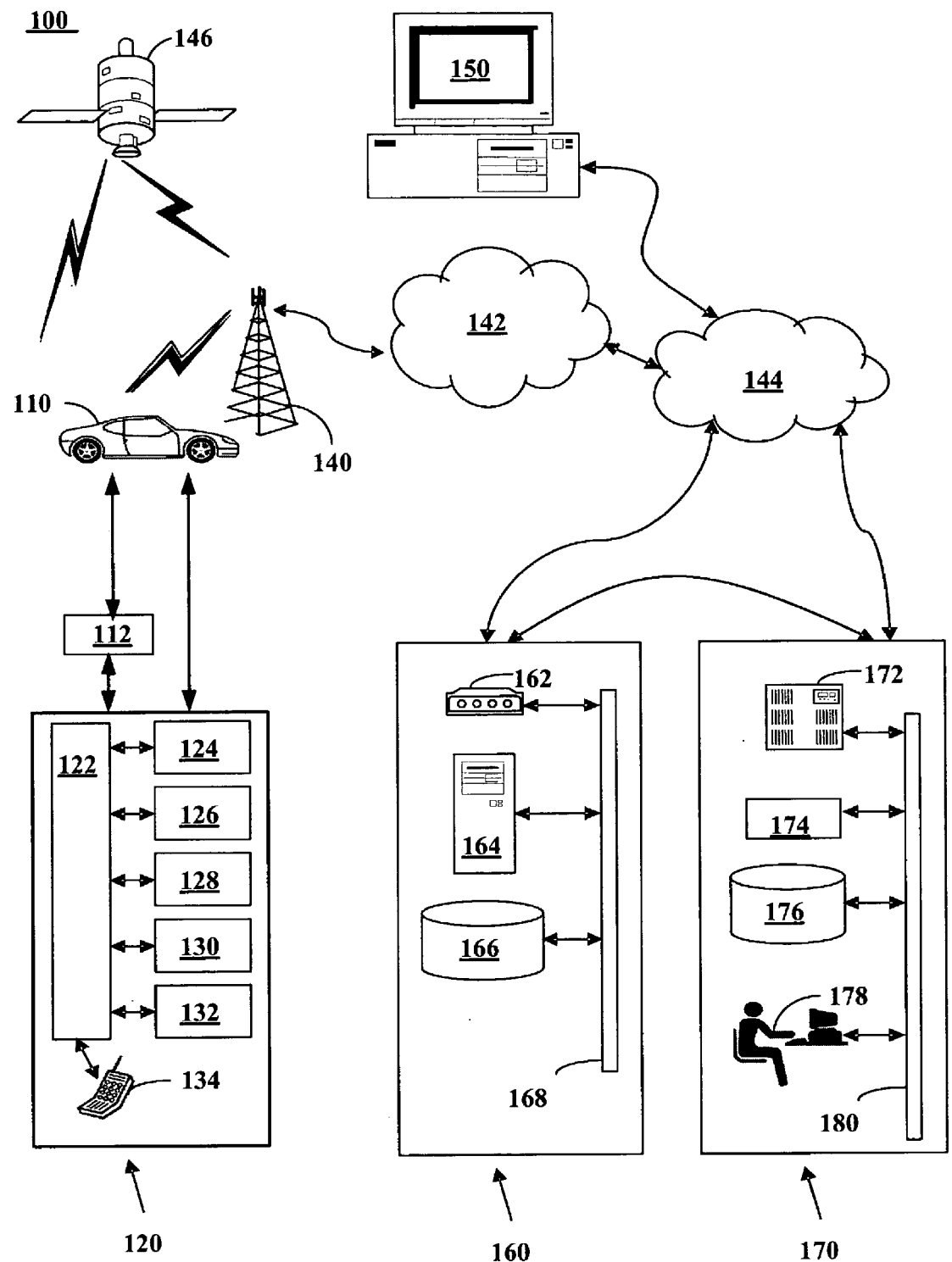
FIG. 1 illustrates an operating environment for a method for establishing communication with a mobile vehicle.

FIG. 1 illustrates an operating environment for a mobile vehicle communication system ("MVCS") 100 for navigation. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180. For example, communication services manager 174 may include at least one digital and/or analog modem.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
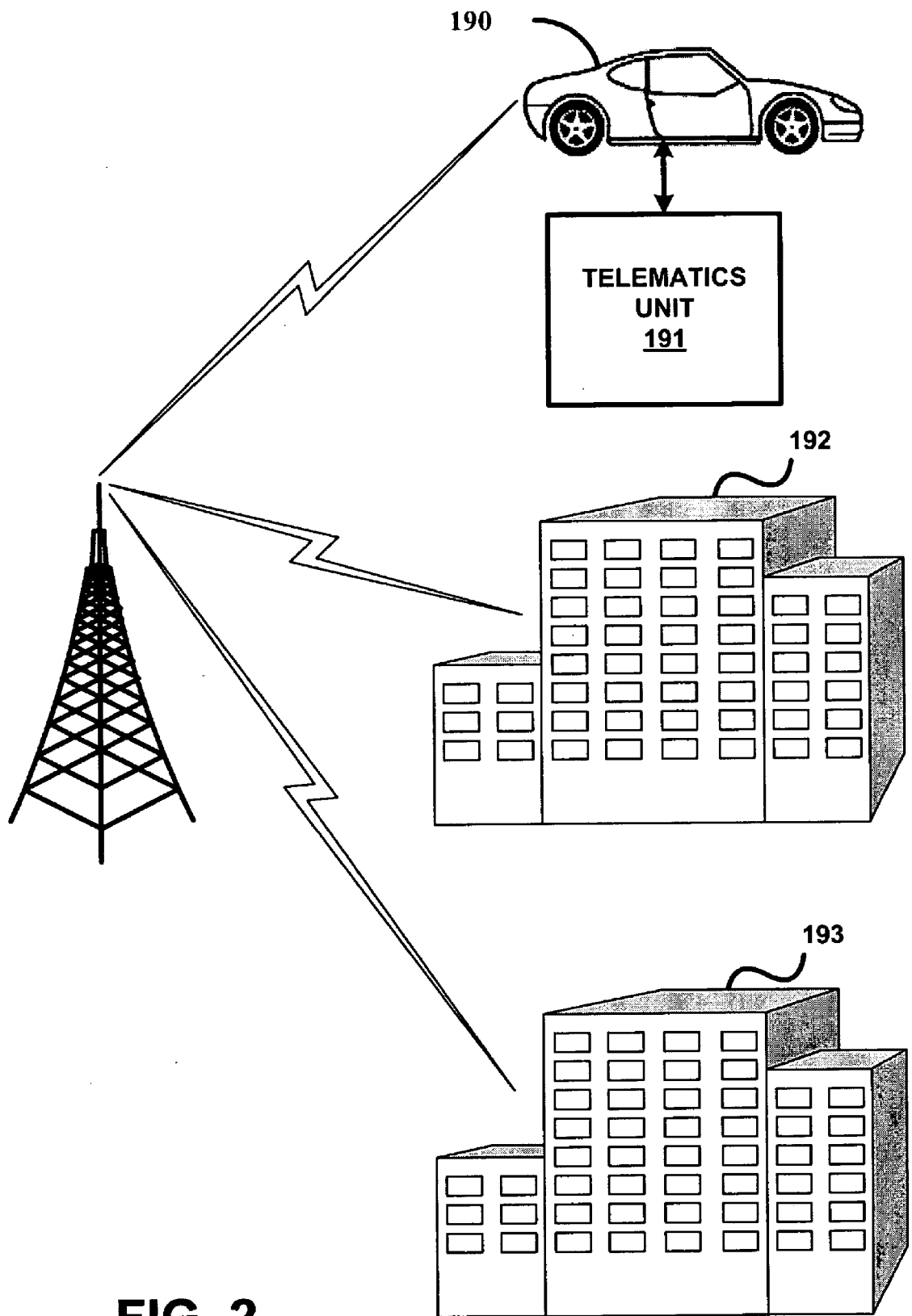
FIG. 2 illustrates an operating environment for implementing a marketing information acquisition method of the present invention.

FIG. 2 illustrates one exemplary operational environment for practicing various marketing acquisition methods of the present invention. Specifically, the operational environment as shown encompasses vehicle 190 and an associated telematics unit 191 (e.g., vehicle 110 and telematics unit 120 shown in FIG. 1) as well as a telematics call center 192 (e.g., call center 170 shown in FIG. 1). For purposes of the present invention, the term "telematics call center" is broadly defined herein as a call center established for purposes of wirelessly providing telematics services and products to in-vehicle telematics units. For the operational environment shown in FIG. 2, telematics call center 192 is established for purposes of wirelessly providing telematics services and products via data and voice to in-vehicle telematics unit 191.

The operational environment further encompasses a marketing call center 193. For purposes of the present invention, the term "marketing call center" is broadly defined herein as a call center established for purposes of wirelessly marketing/promoting telematic services and products to in-vehicle telematics units. For the operational environment shown in FIG. 2, marketing call center 192 is established for purposes of wirelessly providing marketing/promoting telematic services and products via voice to in-vehicle telematics unit 191.

The present invention is directed to marketing information acquisition methods for triggering an in-vehicle telematics unit to initiate a call to a marketing call center to acquire marketing information from the marketing call center. To facilitate an understanding of the present invention, various marketing information acquisition methods of the present invention will now be described herein in connection with the operational environment shown in FIG. 2. Nonetheless, from such descriptions, those having ordinary skill in the art will appreciate the applicability of the various marketing information acquisition methods of the present invention to operational environments having more complexity and diversity than the operational environment shown in FIG. 2.

Figure 3:
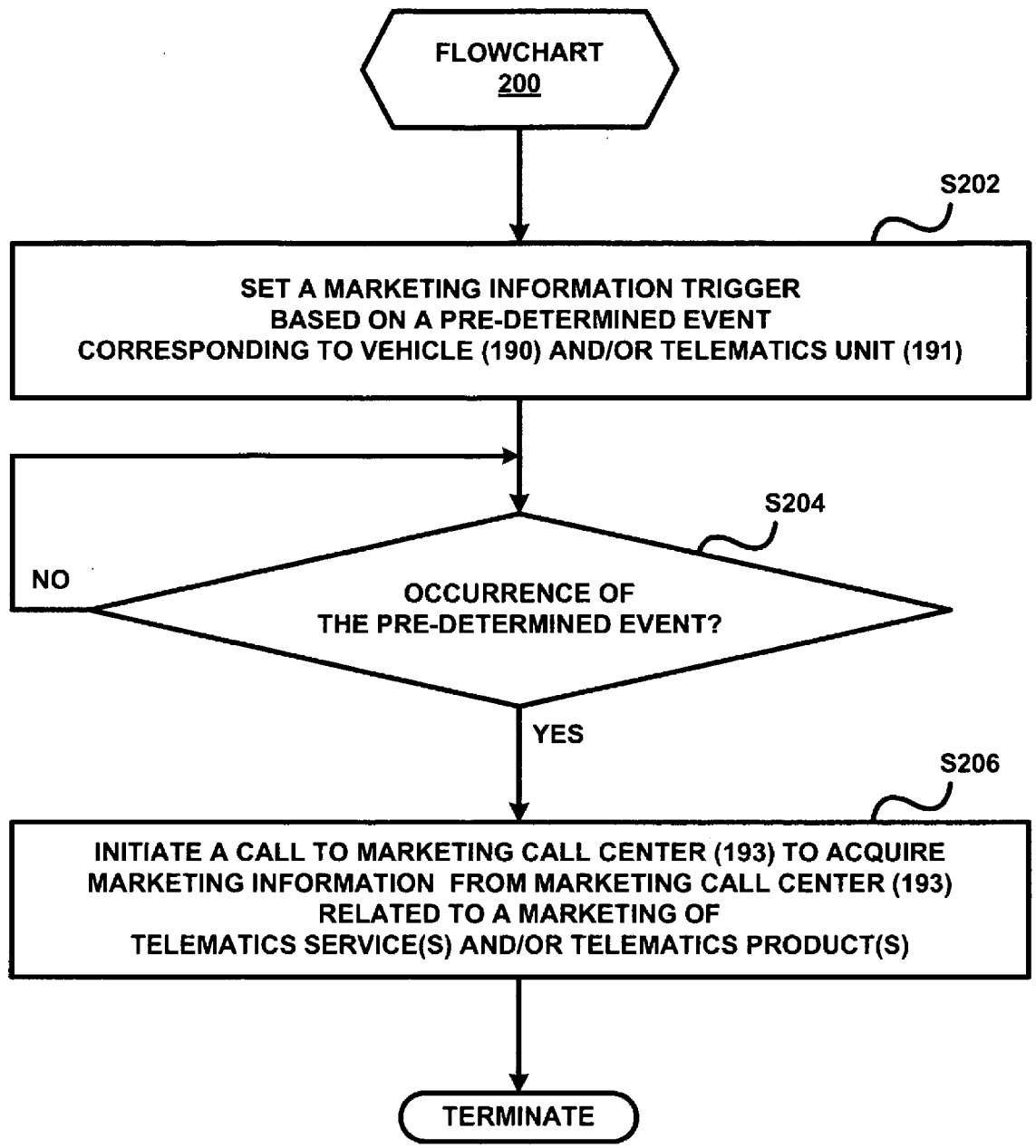
FIG. 3 illustrates a flow chart representative of a marketing information acquisition method of the present invention.

FIG. 3 illustrates a flowchart 200 representative of a marketing information acquisition method of the present invention for actively acquiring marketing information from marketing call center 193 as implemented primarily by telematics unit 191. A stage S202 of flowchart 200 encompasses telematics unit 191 setting a marketing information trigger. For purposes of the present invention, the term "marketing information trigger" is broadly defined herein as any type of trigger based on a pre-determined event corresponding to a vehicle (e.g., a time period associated with the vehicle, an odometer value of the vehicle, a timestamp associated with the vehicle and a number of ignition cycles of the vehicle) or its associated in-vehicle telematics unit (e.g., a depletion or an expiration of a personal calling bundle). Also for purposes of the present invention, the term "marketing information" is broadly defined herein as any information related, directly or indirectly, to any type of marketing of telematic services and/or telematics products to in-vehicle telematics units.

A stage S204 of flowchart 200 encompasses telematics unit 191 determining whether the pre-determined event has occurred whereby telematics unit 191 will proceed to a stage S206 of flowchart 200 upon the occurrence of the pre-determined event during stage S204. This determination by telematics unit 191 is based on the nature of the marketing information trigger as would be appreciated by those having ordinary skill in the art. For example, if the marketing information trigger is based on an occurrence of a depletion or of an expiration of a personal calling bundle, then telematics unit 191 will proceed to stage S206 upon such an occurrence of the depletion or the expiration of the personal calling bundle.

Stage S206 encompasses telematics unit 191 initiating a call to marketing call center 193 in response to an occurrence of the pre-determined marketing event to acquire marketing information related to marketing telematics service(s) and/or telematics product(s). The present invention does not impose any limitations or restrictions as to the manner by which telematics unit 191 initiates a call to marketing call center 193 in response to an occurrence of the pre-determined marketing event. In one embodiment, telematics unit 191 directly calls marketing call center 193 in response to the occurrence of the pre-determined marketing event. In a second embodiment, telematics unit 191 indirectly calls marketing call center 193 in response to the occurrence of the pre-determined marketing event by calling telematics call center 192, which in turn will automatically or conditionally transfer the call to marketing call center 193.

Figure 4:
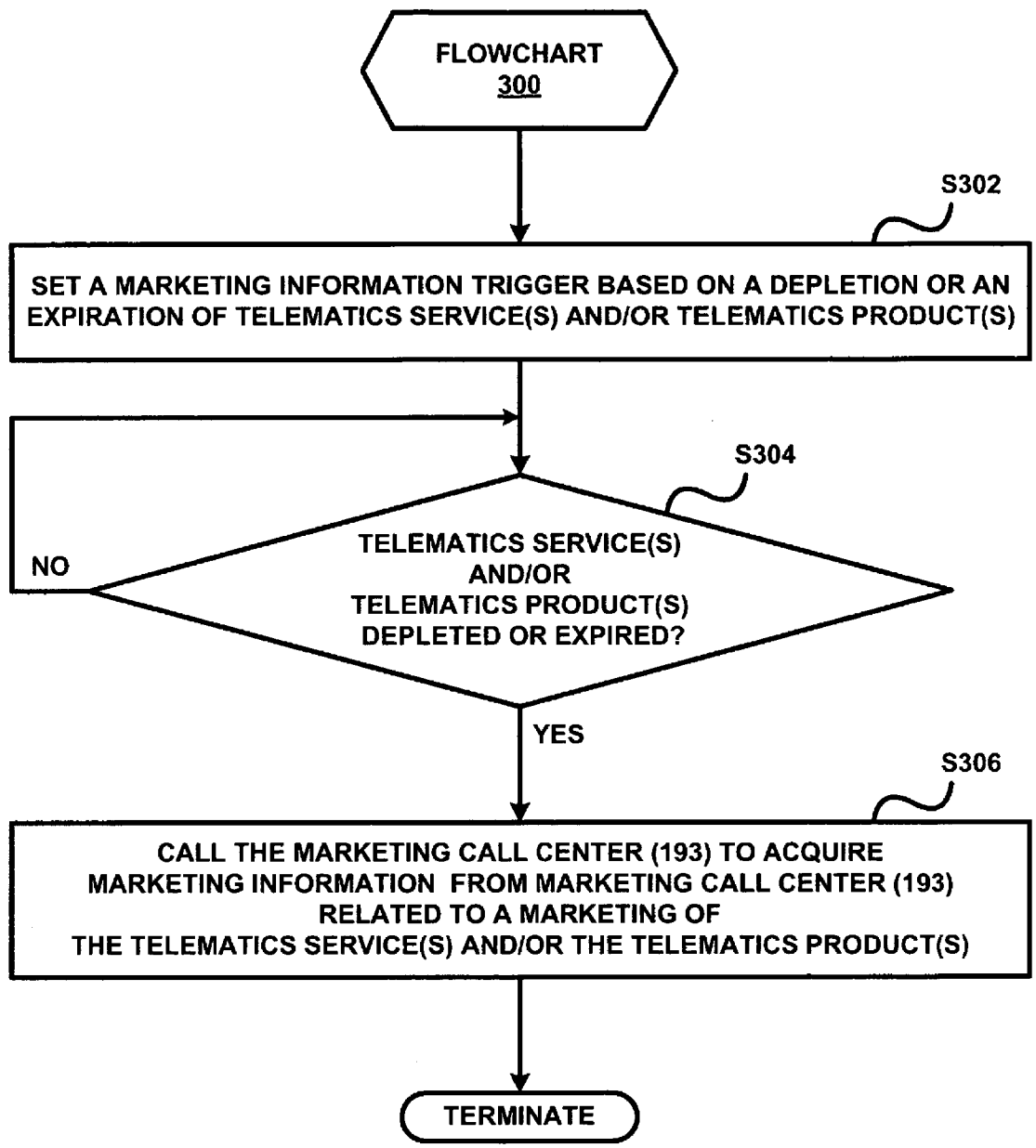
FIG. 4 illustrates a flow chart representative of a first embodiment of marketing information acquisition method of the present invention.

FIG. 4 illustrates a flowchart 300 as one embodiment of flowchart 200 (FIG. 3) as implemented by telematics unit 191. A stage S302 of flowchart 300 encompasses telematics unit 191 setting a marketing information trigger based on a depletion or an expiration of telematics service(s) and/or telematics product(s) (e.g., a personal calling bundle). A stage S304 of flowchart 300 encompasses telematics unit 191 determining whether the telematics service(s) and/or the telematics product(s) has(have) been depleted or has(have) expired. Upon a determination that the telematics service(s) and/or the telematics product(s) has(have) been depleted or has(have) expired, a stage S306 of flowchart 300 encompasses telematics unit 191 directly calls marketing call center 193 to acquire marketing information related to a marketing of the telematics service(s) and/or the telematics product(s).

Figure 5:
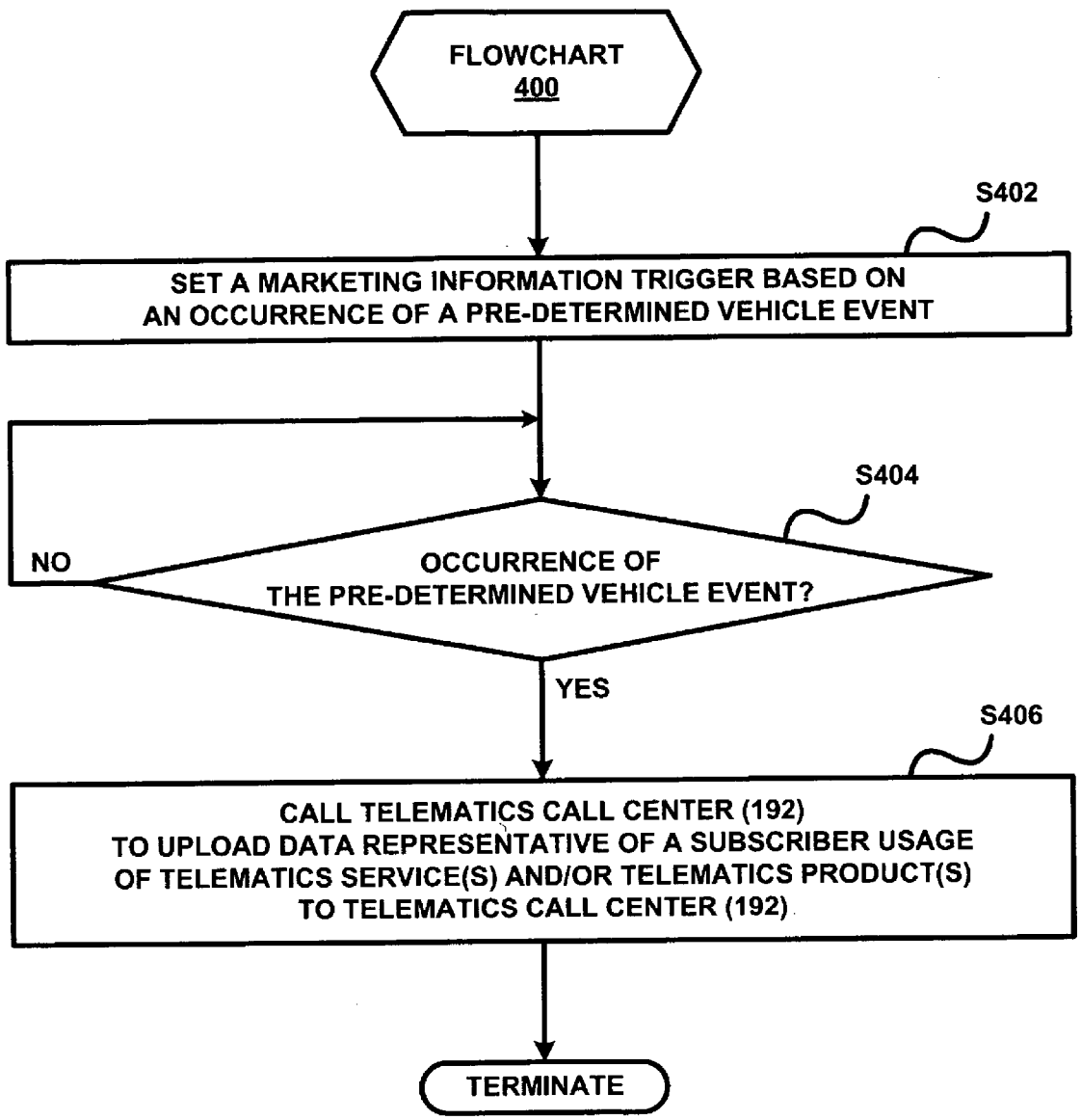
FIGS. 5 and 6 illustrate a flow chart representative of a second embodiment of marketing information acquisition method of the present invention.
Figure 6:
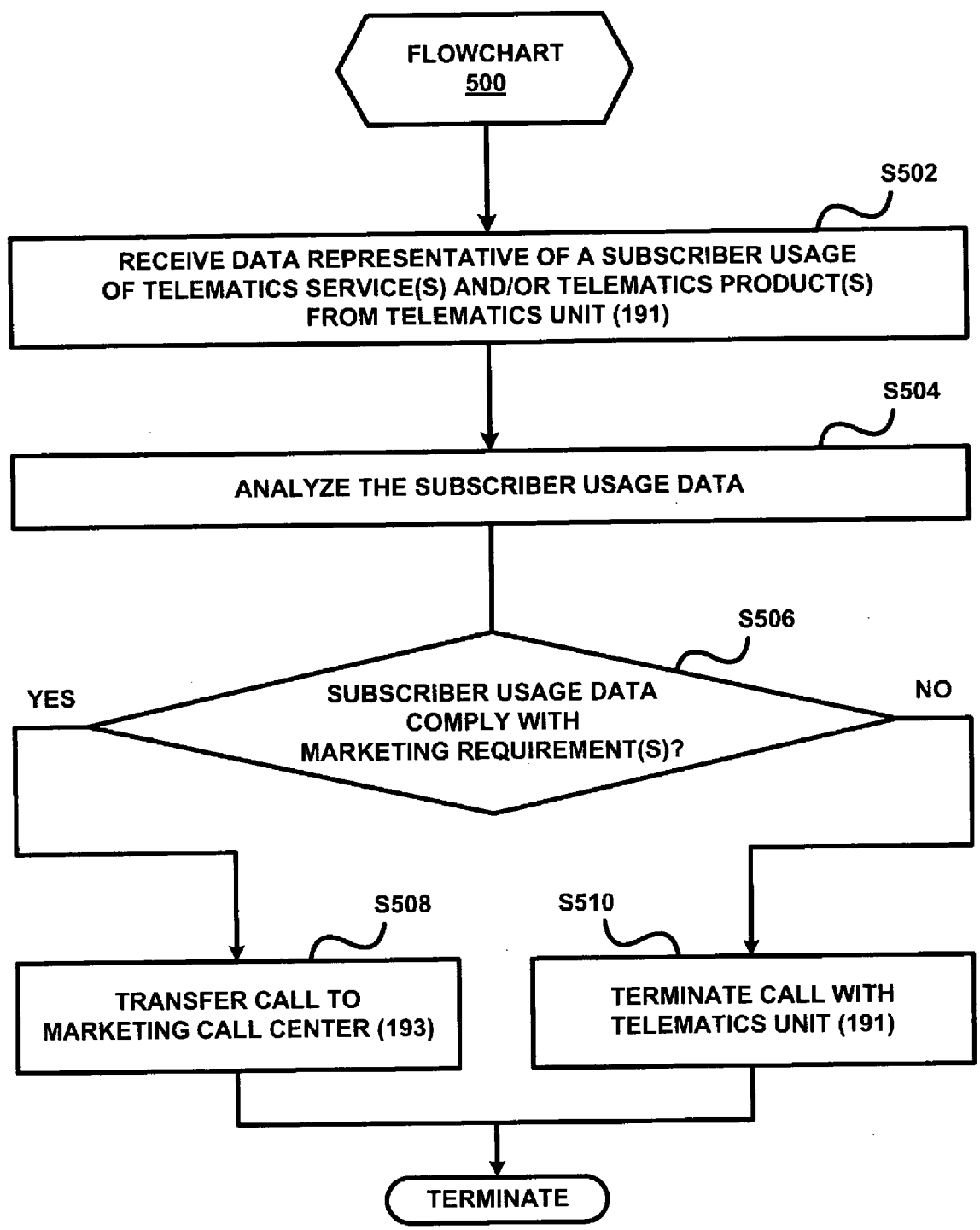

FIGS. 5 and 6 illustrates a flowchart 400 and a flowchart 500 as one embodiment of flowchart 200 (FIG. 3) as implemented by telematics unit 191 and telematics call center 192, respectively. A stage S402 of flowchart 400 encompasses telematics unit 191 setting a marketing information trigger based on an occurrence of a pre-determined vehicle event associated with vehicle 190 (e.g., a time period associated with the vehicle, an odometer value of the vehicle, an occurrence of a timestamp associated with the vehicle, and a number of ignition cycles of the vehicle). A stage S404 of flowchart 400 encompasses telematics unit 191 determining whether the pre-determined vehicle event has occurred. Upon a determination that the pre-determined vehicle event has occurred, a stage S406 of flowchart 400 encompasses telematics unit 191 directly establishing a call with telematics center 193 to upload data representative of a subscriber usage of telematics service(s) and/or telematics product(s).

Telematics call center 192 implements flowchart 500 upon receiving the call from telematics unit 191. A stage S502 of flowchart 500 encompasses telematics call center 192 receiving the data representative of a subscriber usage of the telematics service(s) and/or the telematics product(s) from telematics units 191. A stage S504 of flowchart 500 encompasses telematics call center 192 analyzing the subscriber usage data to facilitate a determination if the subscriber usage data complies with one or more marketing requirements. In one embodiment where subscriber usage data represents the number of minutes remaining in a personal calling bundle, telematics call center 192 compares the subscriber usage data to a marketing information threshold representative of a number of minutes for triggering a transfer of the call from telematics unit 191 to marketing call center 193.

A stage S506 of flowchart 500 encompasses telematics call center 192 determining whether the subscriber usage data complies with the marketing requirement(s). In one embodiment, telematics call center 192 determines the subscriber usage data complies with the marketing requirement(s) in response to the number of minutes remaining in a personal calling bundle as represented by the subscriber usage data being less than the marketing information threshold, and telematics call center 192 determines the subscriber usage data does not comply with the marketing requirement(s) in response to the number of minutes remaining in a personal calling bundle as represented by the subscriber usage data being equal to or greater than the marketing information threshold.

A stage S508 of flowchart 500 encompasses telematics call center 192 transferring the call with telematics unit 191 to marketing call center 193 in response to a determination during stage S506 that the subscriber usage data complies with the marketing requirement(s). Conversely, a stage S510 of flowchart 500 encompasses telematics call center 192 terminating the call with telematics unit 191 in response to a determination during stage S506 that the subscriber usage data does not comply with the marketing requirement(s).

Those having ordinary skill in the art will appreciate the numerous and varied advantages and benefits of the present invention from the description herein of FIGS. 2-6. Furthermore, while the marketing information acquisition method of the present invention was described herein in connection with FIG. 2 to facilitate an understanding of the inventive principles of the present invention, those having ordinary skill in the art will appreciate how to apply the inventive principles of the present invention to any type of telematic operating environment.

The present invention may be embodied in other specific forms without departing from the spirit or essential characteristics. The described embodiments are to be considered in all respects only as illustrative and not restrictive.

What is claimed is:

1. A method for acquiring marketing information from a marketing call center, the method comprising:
   via a processor associated with a vehicle telematics unit, receiving a personal calling bundle in the vehicle telematics unit, wherein the vehicle telematics unit is a vehicle module;
   via the vehicle telematics unit processor, setting a marketing information trigger in the vehicle telematics unit, the marketing information trigger based on a depletion or an expiration of the personal calling bundle;
   the vehicle telematics unit processor determining when the depletion or the expiration of the personal calling bundle has occurred;
   automatically initiating, via the vehicle telematics unit and without user manual operation, a call to a telematics call center, the call including data representative of a usage of the personal calling bundle; and
   upon analyzing the data, transferring the call to the marketing call center so that the telematics unit acquires the marketing information from the marketing call center in response to an occurrence of the depletion or the expiration of the personal calling bundle.

2. A computer readable non-transitory medium including computer readable code embodied thereon that when executed by a computer performs steps for automatically initiating a call to a marketing call center to acquire marketing information from the marketing call center, the computer readable medium comprising:
   computer readable code for receiving a personal calling bundle in a vehicle telematics unit, wherein the vehicle telematics unit is a vehicle module;
   computer readable code for setting a marketing information trigger in the vehicle telematics unit, the marketing information trigger based on a depletion or an expiration of the personal calling bundle;
   computer readable code for determining when the depletion or the expiration of the personal calling bundle has occurred; and
   computer readable code for automatically initiating, via the vehicle telematics unit and without user manual operation, the call to a telematics call center, the call including data representative of a usage of the personal calling bundle; and
   computer readable code for transferring the call to the marketing call center upon analyzing the data so that the telematics unit acquires the marketing information from the marketing call center in response to an occurrence of the depletion or the expiration of the personal calling bundle.

3. A system for acquiring marketing information from a marketing call center, the system comprising:
   a vehicle telematics unit configured to receive a personal calling bundle, wherein the vehicle telematics unit is a vehicle module;
   a processor associated with the vehicle telematics unit, the processor being configured to: i) set a marketing information trigger in the vehicle telematics unit, the marketing information trigger based on a depletion or an expiration of the personal calling bundle; ii) determine when the depletion or the expiration of the personal calling bundle has occurred; iii) automatically initiate a call, without user manual operation, to a telematics call center, the call including data representative of a usage of the personal calling bundle; and iv) upon analyzing the data, transferring the call to the marketing call center so that the telematics unit acquires the marketing information from the marketing call center in response to an occurrence of the depletion or the expiration of the personal calling bundle.

* * * * *